United States Patent [19]

Denney

[11] Patent Number: 5,620,552
[45] Date of Patent: Apr. 15, 1997

[54] METHOD OF PRODUCING A SLIP-RESISTANT SUBSTRATE BY DEPOSITING RAISED BEAD-LIKE CONFIGURATIONS OF A COMPATIBLE MATERIAL AT SELECT LOCATIONS THEREON, AND A SUBSTRATE INCLUDING SAME

[75] Inventor: Paul E. Denney, State College, Pa.

[73] Assignee: The Penn State Research Foundation, University Park, Pa.

[21] Appl. No.: 304,255

[22] Filed: Sep. 12, 1994

Related U.S. Application Data

[62] Division of Ser. No. 744,199, Aug. 12, 1991, Pat. No. 5,368,947.

[51] Int. Cl.⁶ .................................................. B32B 31/00
[52] U.S. Cl. .................................. 156/272.2; 156/272.4; 156/379.7; 427/597
[58] Field of Search .............................. 156/322, 272.2, 156/272.4, 379.7; 427/552, 556, 555, 566, 597

[56] References Cited

U.S. PATENT DOCUMENTS

| | | |
|---|---|---|
| 4,281,030 | 7/1981 | Silfvast . |
| 4,299,860 | 11/1981 | Schaefer et al. . |
| 4,300,474 | 11/1981 | Linsey . |
| 4,488,882 | 12/1984 | Dousinger et al. . |
| 4,496,607 | 1/1985 | Mathias ................................. 427/555 |
| 4,644,127 | 2/1987 | La Rocca ....................... 219/121.64 X |
| 4,724,299 | 2/1988 | Hammeke ...................... 219/121.65 X |
| 4,743,733 | 5/1988 | Mehta et al. . |
| 4,814,575 | 3/1989 | Petitbon ............................. 219/121.64 |
| 4,818,562 | 4/1989 | Arcella et al. . |
| 5,208,431 | 5/1993 | Uchiyama et al. .............. 156/272.8 X |

FOREIGN PATENT DOCUMENTS

| | | | |
|---|---|---|---|
| 622476 | 11/1994 | European Pat. Off. ............... | 427/597 |

*Primary Examiner*—David A. Simmons
*Assistant Examiner*—Paul M. Rivard
*Attorney, Agent, or Firm*—Thomas J. Monahan

[57] ABSTRACT

An article having a slip-resistant surface and method of producing the same includes metallurgically bonding raised bead-like configurations of a compatible material at select locations on the article surface. The method includes injecting, substantially simultaneously with projecting a high power radiant energy beam, powder particles into a portion of the beam lying a distance away from the point of impingement on the surface portion of the article. The particles interact with the beam for a time period sufficient to cause at least partial melting of a substantial number of particles which are then transported to a selected point on the surface portion. The partially melted particles, along with completely and/or any substantially unmelted particles, are allowed to bond with the surface material thereby forming a raised configuration thereon. The process is repeated for forming another raised configuration at another selected location on the surface portion for thereby forming a slip-resistant article. The configurations include an upright portion of substantially all sintered particles and extending a substantial distance above the surface portion, and an anchor portion which is embedded a slight distance into the surface portion and includes a weld of the base material uninterrupted with the sintered particles. The anchor portion has a height dimension which is substantially less than the height dimension of the configuration.

19 Claims, 3 Drawing Sheets

METHOD OF PRODUCING A SLIP-RESISTANT SUBSTRATE BY DEPOSITING RAISED BEAD-LIKE CONFIGURATIONS OF A COMPATIBLE MATERIAL AT SELECT LOCATIONS THEREON, AND A SUBSTRATE INCLUDING SAME

This is a division of application Ser. No. 07/744,199, filed Aug. 12, 1991 now U.S. Pat. No. 5,368,947.

FIELD AND HISTORICAL BACKGROUND OF THE INVENTION

The present invention is directed to the production of non-skid or slip-resistant material and more particularly to a method of producing a slip-resistant substrate by depositing or cladding raised, bead-like configurations of a compatible or dissimilar materials at select locations on the substrate surface by using a high power radiant energy source, such as a laser, an electron beam, plasma transfer arc and the like, and a substrate including the same thereon.

In certain industrial settings there are many locations that are difficult or even hazardous for personnel and/or motorized vehicles to move across due to materials that may coat the floor. Such materials include water, mud, snow, oil, blood, inks, and other slippery chemicals. If no precautions are taken, slips and falls may occur to personnel that can lead to costly injuries.

In order to reduce the chances of slips and falls, many propose to alter the surfaces to increase traction (or the coefficient of friction) in areas where accidents are most likely to occur. There are a number of methods to alter the surface characteristics to increase the traction. They include using stamped or rolled materials, flame sprayed aluminum coatings, hot rolled materials, and grit bearing paints or tapes. All of these materials increase traction by populating the surface with aspirates which increase the frictional forces.

However, the presently available non-skid materials all have some negative aspects. Rolled materials, such as Diamond Plate, do not increase the frictional forces substantially because of the large size of the features that are rolled into the material. Stamped materials, materials that are cut and bent, have very high frictional forces but must be formed out of thin materials which cannot withstand high loadings (such as with motorized material handlers) and must be formed and joined to the area that is covered. Flame sprayed aluminum, paints, and tapes often flake or wear-off, especially under high loads. The use of hot rolled fabricated (carbon steel) materials is limited since they cannot be formed extensively.

Further, as noted above, conventional methods for making non-skid materials include hot-rolling of particles into a surface, hot-rolling of "rough" patterns into the surface, and flame-spraying of a material onto the surface, such as aluminum. The rolling of particles or patterns for producing the non-skid effect requires that the final structure be cut from a large plate. If the plate requires further fabrication, however, such as bending, cutting, and/or shaping, it may result in a loss of the non-skid characteristics of the plate. Moreover, the rolling of particles and flame-spraying techniques do not result in true metallurgical bonding between the "roughing" agent (the particles) and the base material. Therefore, this may lead to defoliation of the particles which can then become trapped in the machinery and adversely affect the non-skid characteristics of the material.

The use of laser or other high energy carrying radiation beams in metallic coating of a metallic substrate for repairing or improving wear resistance, or surface hardening of a metallic article is disclosed in U.S. Pat. Nos. 4,251,709; 4,281,030; 4,299,860; 4,300,474; 4,488,882; 4,698,237; 4,743,733; 4,810,525; German Patent 2,129,926; and Bruck, G. J., "High Power Laser Beam Cladding", R&D Paper 87-1D4-METAL-P1, Westinghouse (Jan. 30, 1987) and Nurminen et al., "Laser Cladding and Alloying For Surface Modifications", R&D Scientific Paper 87-1D4-METAL-P2, Westinghouse (Aug. 10, 1987).

The conventional techniques appear to emphasize, however, smooth coating of substrates, and therefore, cannot be used in fabricating non-skid or slip resistant surfaces of plates, equipment, fixtures, or structures, for application in hazardous areas for personnel protection. The need for such slip-resistant or non-skid surfaces is particularly evident on, for example, the deck plate or launching pad of a naval vessel, such as an aircraft carrier. Due to the adverse and, at times, hostile conditions that are frequently encountered by naval personnel, it becomes critical that the deck surface have a high coefficient of friction to avoid slipping, skidding, etc.

Accordingly, there is a need in the art for a method of producing a slip-resistant material which does not suffer from the disadvantages associated with conventional techniques, and a novel substrate material including improved slip-resistant characteristics.

OBJECTS AND SUMMARY OF THE INVENTION

The principal object of the present invention is to provide an improved method of producing a non-skid, anti-slip, slip-resistant or non-slip surface on a substrate material.

Another object of the present invention is to provide a novel substrate or base material with improved non-skid, anti-slip, slip-resistant, and/or non-slip characteristics.

Yet another object of the present invention is to provide a substrate novel/base material which is wear, fatigue, and corrosion resistant.

Still yet another object of the present invention is to provide a method which can be used to produce a slip-resistant surface on a near finished substrate surface.

A further object of the present invention is to provide a method wherein the "roughing" agent (metallic or non-metallic particle powder) forms a true metallurgical bond with the base material, and does not tend to flake-off therefrom.

Yet a further object of the present invention is to provide a method wherein fully dense or metallurgically bonded clads (bead-like, raised configurations) are obtained.

Still yet a further object of the present invention is to provide a method wherein the "roughing" agent can be applied to very thin base materials with little or no distortion.

An additional object of the present invention is to provide a method which allows shaping or forming of parts, articles, substrates, or the like after the non-skid material ("roughing" agent) has been applied to the part forming the base material.

Yet an additional object of the present invention is to provide a method which can be used to make non-skid surface on a wide variety of metal and non-metal materials, for example, carbon steel, stainless steel, aluminum, titanium alloys, as well as thermosetting plastics.

Still yet an additional object of the present invention is to provide a method that can be used to pattern a non-skid surface on a base material. This can be done to maximize the coefficient of friction in a specific direction or to clad only selected areas of a much larger surface without "roughing" the entire structure, or adding an additional plate with the non-skid material.

A further object of the present invention is to provide a method of producing a slip-resistant surface wherein the "roughing" agent is deposited on the surface in a manner that only partial melting of the particles takes place. As a result, a rougher surface is produced than occurs where there is a complete melting of the particles.

Yet a further object of the present invention is to provide a method of producing a slip-resistant surface wherein a substantially minimal dilution of the base material occurs.

Still yet a further object of the present invention is to provide a method of producing slip-resistant surface which allows for the production of highly flexible slip-resistant material.

In summary, the main object of the present invention is to provide a method of producing a slip-resistant surface by depositing a suitable roughing agent thereon, and a substrate including same.

BRIEF DESCRIPTION OF THE DRAWINGS

The above and other objects and advantages and novel features of the present invention will become apparent from the following detailed description of the preferred embodiment of the invention illustrated in the accompanying drawings, in which.

DETAILED DESCRIPTION OF THE INVENTION

The development of the present invention for the production of a non-skid, anti-slip, slip-resistant, or non-slip surface on a substrate material, which is also wear, fatigue, and corrosion-resistant, was based on the inventor's experience in the area of laser cladding. In laser cladding, a "roughing" agent, such as a particle powder, is preplaced or continuously fed on a substrate material wherein limited melting of the underlying substrate material occurs, and partially and/or fully melted particles are metallurgically, bonded to the substrate surface. This is distinguishable from laser alloying wherein the laser beam melts the surface of a substrate material with simultaneous injection of the alloying material for producing a composite or compositionally modified surface layer.

The present process can be used to coat a substrate to rebuild a worn and/or corroded area, to protect against wear and/or corrosion, or to alter the surface chemistry of the material to achieve the desired properties. More particularly, the present process is used to clad a substrate material with a series of raised, bead-like configurations B of a compatible material in order to make the substrate slip-resistant. (It should be noted that the terms used herein, such as non-skid, non-slip, slip-resistant, and anti-slip, all designate a material surface which prevents skidding, slipping or the like of personnel and/or vehicles, etc., and wherein the non-skid features or configurations have a higher coefficient of friction than the underlying substrate surface.)

In developing the process of the invention for depositing a non-skid material the goal was to develop a radiation process configuration/application method that would deposit a minimal desired amount of the powder material at a specific location on a substrate with a minimal amount of heat input (which will also minimize the amount of substrate material dilution and distortion), and continue to add material to the molten pool of substrate and particle material to increase the coefficient of friction. As noted below in Tables A and B, the parameters and hardware that could be altered in the process developed were extensive. This included all of the parameters associated with a laser (power density, focal point, spot size, type, etc.) as well as the process passage 36 surrounding focusing head 34 and the plasma suppression parameters (powder size, feed rate, feed gas, feed gas pressure, travel speed, etc.).

Figure 1:
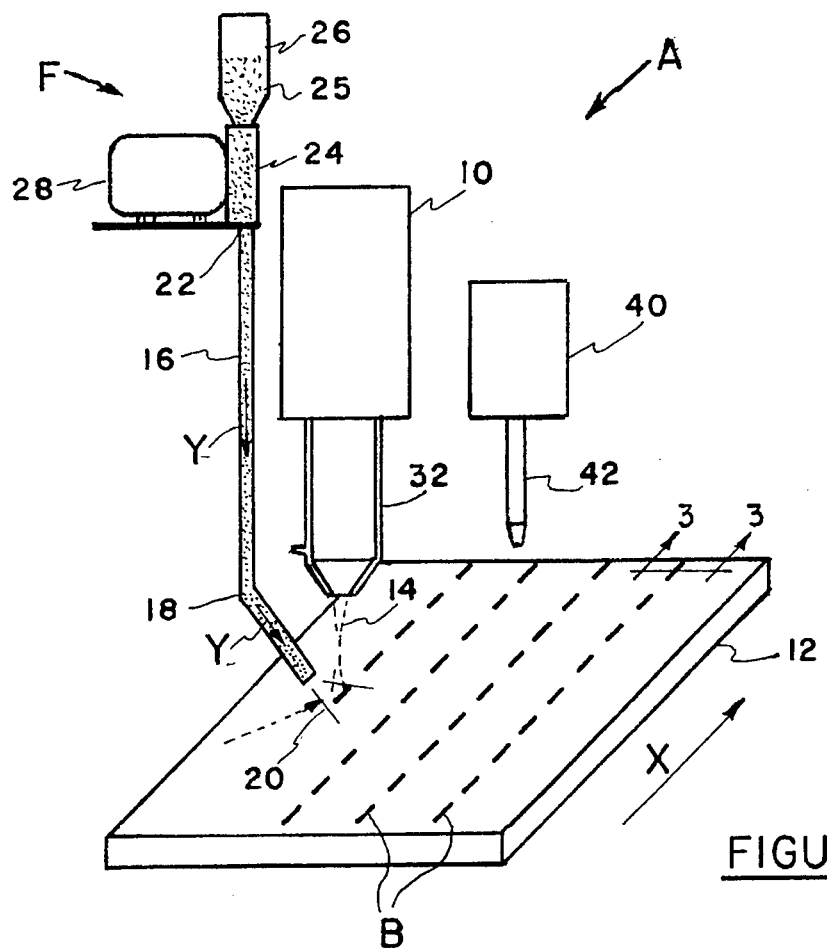
FIG. 1 is a schematic representation of an apparatus for carrying out the method of the invention.
Figure 2:
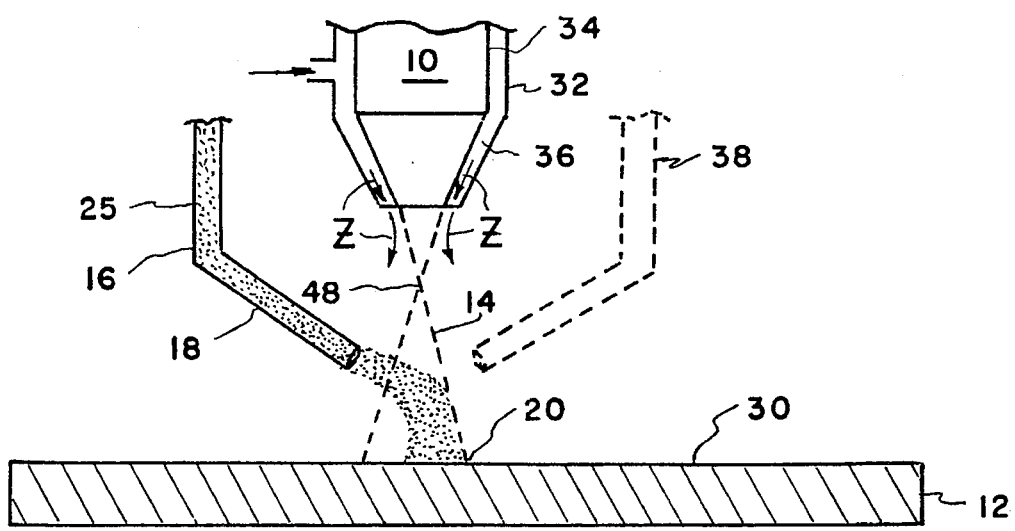
FIG. 2 is a partial enlarged front elevational view of the apparatus shown in FIG. 1, showing in broken lines an additional nozzle for injecting powder.

As illustrated in FIGS. 1 and 2, the apparatus A for use in the present invention includes a high power radiant energy source 10 mounted vertically above a work-piece or substrate material 12 so that its defocused beam 14 is perpendicular thereto. The radiation source 10, which may be a laser or electron beam source, preferably remains fixes, while substrate 12 is displaced along a direction shown by arrow X, at a predetermined constant speed relative to source 10. A powder feed mechanism F is provided adjacent radiation source 10 and includes a powder feeding tube 16 that has an inclined end portion 18 directed towards the area of impingement 20 of energy beam 14. The upper end 22 of feeding tube 16 is connected to a chamber 24 that receives particle powder 25 from source 26 and a carrier gas from source 28. As indicated by arrows Y, powder particles 25 entrained in the carrier gas travel down through feeding tube 16 and are ejected out therefrom into energy beam 14.

As best shown in FIG. 2, the feeding tube 16 is oriented so that the powder particles 25 are directed into the energy beam 14, preferably at a point laying slightly above the beam impingement point 20. This arrangement allows powder particles 25 to have sufficient time within which to interact with beam 14 for causing at least partial melting thereof before they hit or make contact with substrate surface 30. Although not shown, an appropriate device would be provided in connection with powder source 26 in order to make certain that the particles are metered into the carrier gas stream at a predetermined constant rate.

As shown in FIGS. 1 and 2, a plasma suppression gas supplying nozzle 32 is mounted coaxial with the focusing head 34 of radiation source 10. The nozzle 32 essentially forms a circular passage 36 surrounding focusing head 34 and the plasma suppression gas is flown downwardly, outwardly therefrom simultaneously with beam 14, shown by arrows z. As one of ordinarily skill in the art would appreciate that nozzle 32 would be connected to a source for supplying plasma suppression gas (not shown). The function of plasma suppression gas is to prevent the powder particles 25 being delivered from tube 16 from being diverted upwardly toward focusing head 34 of the radiation source 10 and interfering with the focusing system thereof. Further, the flow of plasma suppression gas deflects the particles downwardly towards the point of beam impingement 20.

The powder feeding tube 16 is positioned so that the powder 25 is injected generally transverse to the travel direction x of the substrate 12. It should be noted, however, that the powder 25 may also be injected from the front of beam 14, pointing opposite to the direction of travel, or from behind the beam 14, pointing in the direction of travel. The end portion 18 of feeding tube 16 is inclined so as to inject the powder 25 at an angle of between about 30° to about 60° relative to substrate surface 30. As shown in broken lines in FIG. 2, another feeding tube 38, similar to tube 16, may be positioned on the opposite side of tube 16 for injecting powder particles from both sides.

As shown in FIG. 1, a suction or the like device 40 with nozzle 42 is provided for vacuuming off and recycling excess powder particles that do not fuse with substrate 12. It should be noted that other conventional means may be provided for removing excess powder particles from substrate surface 30 and the present invention is not limited to the use of a vacuum device 40.

An alternative approach within the scope of the invention is to keep substrate 12 stationary while focusing head 34 or the radiation source 10 is either manipulated by an articulated robot (not shown) or the like mechanism so as to traverse substrate surface 30. It should be noted that in the approach where the energy source 10 is translated relative to the fixed substrate 12, the powder feed mechanism F would also be moved simultaneously with radiation source 10.

In carrying out the method of the invention, various system parameters can be used. Table A below lists the non-limiting ranges of these parameters, while Table B lists the preferable ranges thereof.

TABLE A

RECOMMENDED OPERATING PARAMETERS AND BEAD DIMENSIONS

| | |
|---|---|
| Radiation Source | Laser or election beam |
| Laser Type | 1.5 KW to 14 KW $CO_2$, or 400 W pulsed Nd:YAG laser |
| Laser Power | 800 W–1500 W |
| Travel Speed | 15 ipm–40 ipm |
| Powder Feed Rate | 40 gm/min–100 gm/min or 6.6 lbs/hr–13.2 lbs/hr |
| Particle Size | 0.0017–0.0098 inch (60 to 325 mesh, U.S. Standard Sieve Series No.) |
| Base Material | 0.125 inch thick carbon steel |
| Gas Flow Rate (plasma suppression) | 20–30 cfh |
| Gas Flow Rate (powder carrier gas) | 25–40 cfh |
| Type of Gas | Any (Helium, air, etc.) |
| Position Of Powder Delivery | Front, Side, Back |
| Bead Diameter/Width | 0.0625–0.0055 inch |
| Bead Height (D-FIGS. 3 and 4) | 0.0625–0.0055 inch |
| Bead Anchor Portion Height (d-FIGS. 3 and 4) | 0.0025–0.0005 cm. |

TABLE B

PREFERRED OPERATING PARAMETERS AND BEAD DIMENSIONS

| | |
|---|---|
| Radiation Source | Laser |
| Laser Type | 1.5 KW $CO_2$ laser |
| Laser Power | 1000 Watts |
| Travel Speed | 30 ipm |
| Powder Feed Rate | 75 gm/min or 9.9 lbs/hr |
| Particle Size | >150 microns (>100 mesh) |
| Gas Flow Rate (plasma suppression) | 26 cfh |
| Gas Flow Rate (powder carrier gas) | 32 cfh |
| Type of Gas | Any |
| Position of Powder Delivery | Side |
| Bead Diameter/Width | >0.065 inch |
| Bead Height (D-FIGS. 3 and 4) : | >0.035 inch |
| Bead Anchor Portion. Height (d-FIGS. 3 and 4) | 0.0015 cm. |

The substrate 12 can be formed of a metallic material, such as iron, carbon or stainless steel, aluminum, titanium, and alloys thereof, or of a non-metallic material, such as thermosetting plastics. The powder material 25 for forming the bead-like configurations B on the substrate surface 30 can be a nitride, a carbide, a boride, a silicide, or mixtures thereof, of a metallic material. The metal being one of tungsten, stainless steel, carbon steel, aluminum, ceramics, alumina, titanium, or mixtures thereof. Thermosetting plastic particles may be used in the instances where the substrate is made of a compatible plastic material. The non-skid or powder material can be in the form of a powder, rod, slurry or any other form that allows the non-skid material to reach the interaction site between energy beam 14 and the substrate surface 30, in at least partially melted stage. It should be noted that the preceding is a non-limiting list of various materials that can be used in the present invention and other materials can also be used in making a substrate or an article with a slip-resistant or non-skid surface.

In order to carry out the method of the present invention, the operating parameters are selected and a defocused beam 14 of radiation energy source 10, such as a laser, is projected at a select location on substrate surface 30. The selected non-skid material—the powder particles—is injected substantially simultaneously with projecting the beam 14 on substrate 12. The particles 25, as noted above, are injected preferably from the side into the beam area lying a distance away from the point of beam impingement 20 on substrate surface 30. The particles 25 are deflected downwardly toward the beam impingement point 20 due to the downward flow of plasma suppression gas coming out from nozzle 32 coaxially with beam 14. The injection of particles 25 slightly above the substrate surface 30 and transverse to the direction of substrate travel, allows the powder particles to interact with beam 14 for a sufficient amount of time to melt and be deflected by the suppression gas to substrate surface 30.

The momentary interaction of beam 14 with substrate material 12 prior to and during particle injection, keeps the substrate material dilution to a minimum, i.e., about 0–10%, and preferably about 3–5%. A secondary effect is that as the powder 25 is being delivered, a portion of the particle powder 25 would not receive sufficient heat input from beam 14 so to be totally melted, but the partially melted portion would, nonetheless, be deflected into the molten pattern that becomes bonded or adhered to the substrate surface 30. In other words, a substantial number of powder particles are only partially melted, or not melted at all, but nonetheless get deposited along with a pool of totally molten particles on substrate surface 30. (In FIGS. 3 and 4, partially and unmelted particles have been designated by reference numbers 27 and 29, respectively.) This imparts a rougher surface configuration to the formed bead or configuration B.

A relative motion between the energy source 10 and substrate 12 allows the melted and/or partially melted particles to form a metallurgical bond with substrate surface 30. It should be noted that larger particles would have a higher tendency to remain solid or partially solid during interaction with beam 14 which, when bonded together with completely melted particles, give the bead-like configurations B a granular effect on the surface making them rougher than common-laser clads.

The present process has a very low dilution rate (less than 10%) of the base (substrate) material. (Dilution may be defined as the change in composition of the cladding or non-skid material caused by mixing of melted substrate material into the deposit. Dilution is expressed as the percent of base metal in the total clad deposit and is readily calculated by area measurement of cross-sections of the clad.) This occurs through a balancing of process parameters, such as carrier and plasma suppression gas flow rates, particle size, particle feed rate, substrate travel speed, and radiation source power density. The operating window for low dilution can be varied widely but it was found that optimum parameter settings existed for the highest deposition rate. It was found that the optimum operating values will change with variations in the density/chemistry of the powder used, i.e., steel versus aluminum.

Further, the inventor of the present invention also found that there was a critical relationship between the powder feed rate, gas flow (both plasma suppression and powder carrier gases), and the position of the powder delivery. The plasma suppression gas is required to prevent the powder that is being delivered from interacting with the laser beam and entering the lens area of the focussing system. The amount of powder (feed rate) and the gas flow rate (powder carrier gas) must be sufficient to transport the required amount of powder to the interaction area. The force of the plasma suppression gas must be countered by the carrier gas velocity and the momentum of the powder. If the carrier flow rate is too low then the powder will not have sufficient momentum to carry it to the interaction point with the laser beam. If the carrier gas velocity is too high, the powder will be blown through the interaction area too quickly and will not melt and create the configuration or "feature". As noted above, the powder density is also important. In this regard, it was observed that by using higher density particles, such as carbon steel and stainless steel, or coarser, more massive particles, better non-skid beads can be produced.

Figure 3:
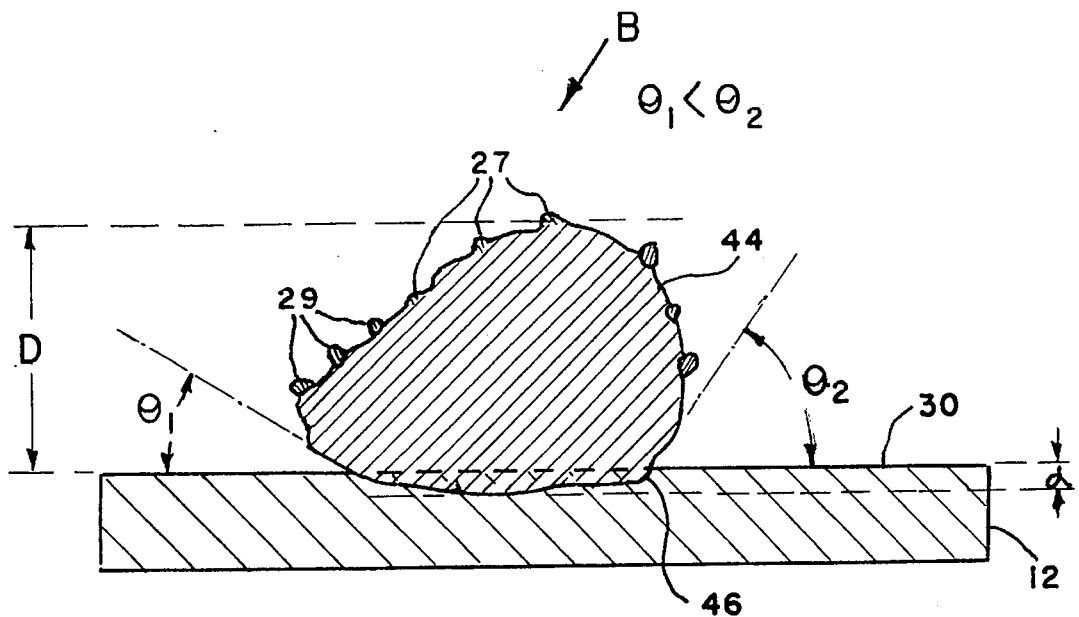
FIG. 3 is an enlarged sectional view taken along line 3—3 of FIG. 1, the line running about mid-section of a linear bead-like configuration.
Figure 4:
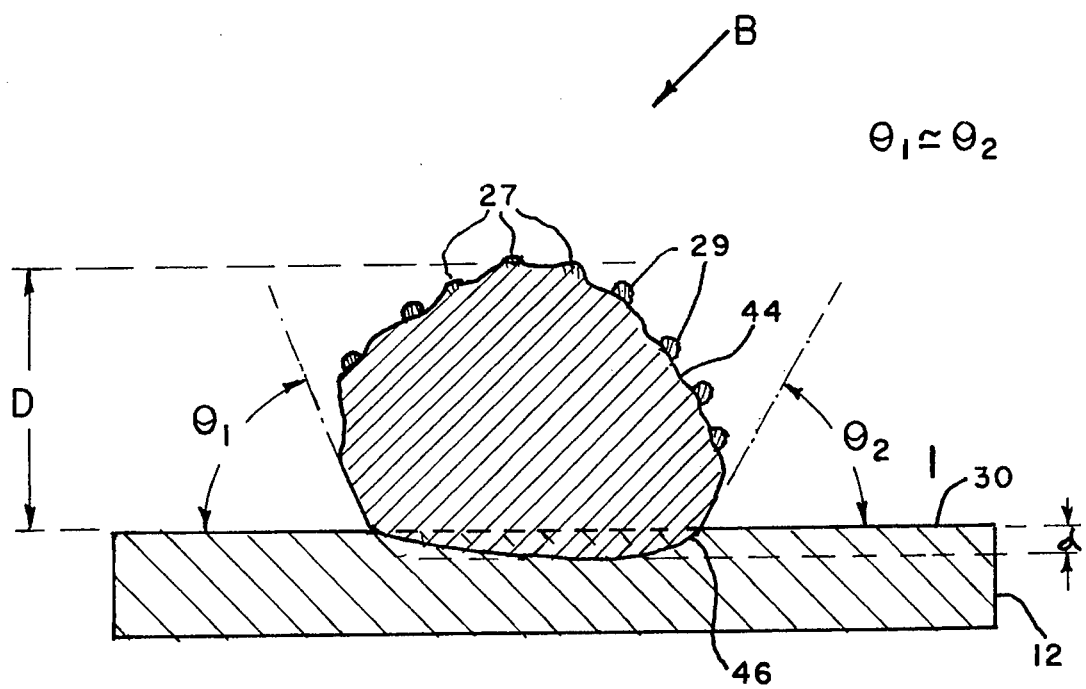
FIG. 4 is a view similar to FIG. 3, showing an alternate embodiment of the bead.

FIGS. 3 and 4 illustrate mid-sectional views of the bead-like configurations. B deposited in accordance with the present invention. In particular, FIG. 3 illustrates the configuration made with the use of only one powder feeding tube 16. The configuration B forms with the substrate surface 30 a side bead or wetting angle $O_2$ of about 45° to about 110°. The side bead angle $O_1$ on the side facing the feeding tube 16 is slightly less than the angle $O_2$ on the opposite side due to the leaning effect of the bead B caused by carrier gas flow. The side bead angles $O_1$ and $O_2$ on both sides of the configuration B tend to correspond to each other (FIG. 4) in the situation where opposed feeding tubes 16 and 38 are used (FIG. 2). About 25% to about 100% of the configurations B form at least one side bead angle of about 45° to about 110°. Preferably, about 75% to about 100% of the configurations B form at least one side bead angle of about 60° to about 100° and, more preferably, all beads B form an acute angle with the substrate surface 30.

Figure 5:
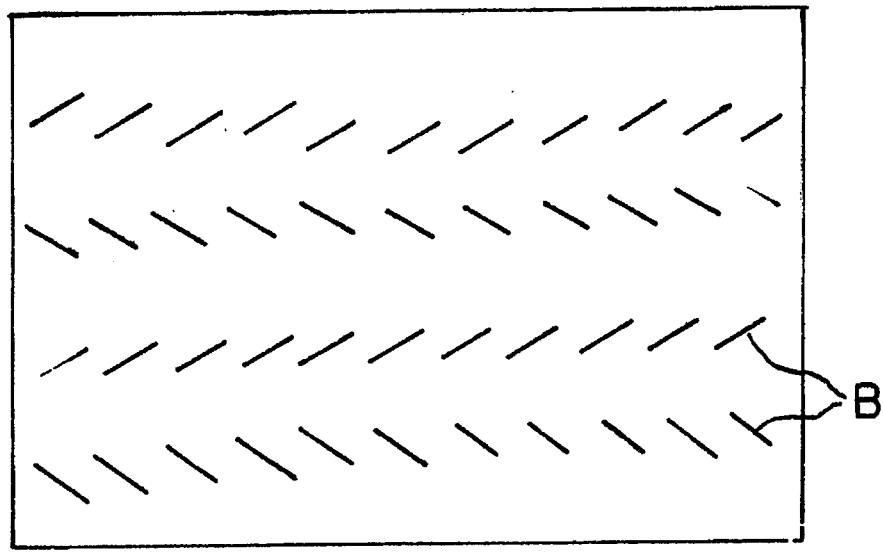
FIG. 5 is a schematic top plan view of a finished substrate with the linear slip-resistant features deposited thereon using the method of the invention.
Figure 6:
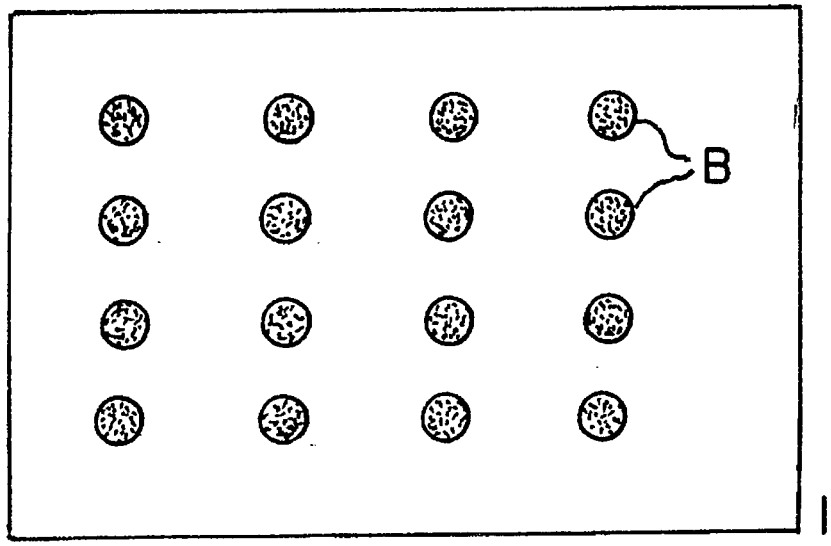
FIG. 6 is a schematic top plan view of a finished substrate with the round slip-resistant features deposited thereon using the method of the invention.

The beads B have an upright portion 44 having a height (D) and an anchor portion 46 embedded a slight distance (d) into substrate surface 30. The anchor portion 46 has a height of about 0.0025 to about 0.0005 cm, and preferably 0.0015 cm. The configurations B can be made so as to have linear (FIGS. 1 and 5) or round shapes (FIG. 6). Other geometrical shapes may also be easily obtained by coordinating relative movement between energy source 10 and substrate 12, power of radiant energy source 10, the distance between the focal point 48 of beam 14 and substrate surface 30.

An example of a substrate made in accordance with the present invention included the following measurements:

EXAMPLE

| BEAD | DIMENSION |
| --- | --- |
| Density | 2.2 beads/in$^2$ |
| Length | 0.21 inch (approx.) |
| Height | 0.037 inch (approx.) |
| Width | 0.065 inch (approx.) |
| Volume | 0.005 inch$^3$ (approx.) |
| Amount of Powder Deposited/Unit Area | 0.0011 inch$^3$/inch$^2$ |
| Mass of Powder/Unit Area | 0.044 lbs/ft$^2$ |
| Wetting or Side Bead Angle | 40–90° (approx.) |

Although not shown, the process of the invention can be easily automated by designing a software for controlling various process parameters.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and of the limits of the appended claims.

What is claimed is:

1. A method of producing a slip-resistant article be bonding raised configurations of a compatible material at select locations on the article surface, the method comprising the steps of:

a) providing a base plate having a surface portion;

b) providing a nozzle having a high power radiant energy source first chamber including focusing means and an orifice for said focusing means;

c) providing a powder feeding tube independent of said nozzle and having an end portion positioned below said nozzle for injecting particles of a material compatible with the base plate material;

d) providing said nozzle with a second chamber for supplying a suppression gas coaxial of said first chamber and radially adjacent thereto and around said focusing means and separated therefrom and having an orifice substantial coplanar with the orifice of said said focusing means;

e) projecting for a preset time period an irradiating beam having a point of impingement at a predetermined location on said surface portion by actuating said energy source;

f) injecting substantially simultaneously with step e) a predetermined quantity of particles into a portion of said irradiating beam at a point lying a distance away from the said point of impingement of said beam on said predetermined location on said surface portion;

g) projecting simultaneously with steps e) and f) a suppression gas downwardly about said irradiation beam and outwardly therefrom to prevent said particles from being directed upwardly toward said focusing means to prevent interference of said particles with said focusing means and to deflect said particles downwardly toward said point of impingement of said beam by actuating said suppression gas supply means;

h) allowing the injected particles to interact with said beam for a time period sufficient to cause partial melting of a substantial number of particles;

i) transporting particles treated in step h) to the point of impingement of said beam on said predetermined location on said surface portion;

j) causing a relative motion between said surface portion and said energy source;

k) allowing partially melted particles on said predetermined location to bond with the surface material thereby forming a raised configuration thereon; and l) repeating steps d)–k) for forming another raised configuration on another location on said surface portion for thereby forming a slip-resistant article.

2. The method of claim 1, comprising the step of:
a) injecting particles substantially transversely to the direction of relative motion between said surface portion and said energy source.

3. The method of claim 1, comprising the step of:
a) injecting particles at a rate of about 50 gm/min to about 100 gm/min.

4. The method of claim 1, comprising the step of:
a) injecting particles entrained in a carrier gas flowing at a rate of about 25 cfh to about 40 cfh.

5. The method of claim 1, wherein:
a) at least one of said configurations forms with said surface portion a wetting angle of about 45° to about 110°.

6. The method of claim 1, wherein:
a) about 25% to about 100% of said configurations form with said surface portion a wetting angle of about 45° to about 110°.

7. The method of claim 1, wherein:
a) about 75% to about 100% of said configurations form with said surface portion a wetting angle of about 60° to about 100°.

8. The method of claim 1, comprising the step of:
a) providing a base plate comprised of a metallic material.

9. The method of claim 1, comprising the step of:
a) injecting particles comprised of a metallic material.

10. The method of claim 1, comprising the step of:
a) injecting particles comprised of a metallic material selected from the group of tungsten, stainless steel, carbon steel, aluminum, titanium, ceramics, alumina, and mixtures thereof.

11. The method of claim 1, comprising the step of:
a) injecting particles comprised of a metallic material selected from the group consisting of a nitride, a carbide, a silicide, a boride, and mixtures thereof.

12. The method of claim 1, comprising the step of:
a) providing a base plate comprised of a non-metallic material.

13. The method of claim 1, comprising the step of:
a) injecting particles comprised of a non-metallic material.

14. The method of claim 1, comprising the step of:
a) providing a high power radiant energy source including a laser source.

15. The method of claim 1, comprising the step of:
a) providing a high power radiant energy source including an electron beam source.

16. The method of claim 1, comprising the step of:
a) injecting particles having a size range of of about 60 to 325 mesh (U.S. Standard Sieve Series No.).

17. The method of claim 1, comprising the step of:
a) causing a relative motion between said surface portion said energy source by moving said surface portion at a speed from about 15 inches/minute to about 40 inches/minute.

18. The method of claim 1, and wherein:
a) said beam includes a front and a rear; and
b) injecting said particles in front of said beam.

19. The method of claim 1, and wherein: a) said beam includes a front and a rear; and b) injecting said particles at the rear of said beam.

* * * * *